(12) United States Patent
Suzuki

(10) Patent No.: US 7,891,891 B2
(45) Date of Patent: Feb. 22, 2011

(54) BLADE DRIVE DEVICE AND OPTICAL DEVICE

(75) Inventor: Mitsuru Suzuki, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/498,580

(22) Filed: Jul. 7, 2009

(65) Prior Publication Data

US 2009/0269048 A1     Oct. 29, 2009

Related U.S. Application Data

(63) Continuation of application No. PCT/JP2009/052574, filed on Feb. 16, 2009.

(30) Foreign Application Priority Data

Mar. 11, 2008  (JP)  .............................. 2008-061794

(51) Int. Cl.
G03B 9/02    (2006.01)
G03B 9/08    (2006.01)

(52) U.S. Cl. ........................ 396/510; 396/452; 396/505

(58) Field of Classification Search ................. 396/257, 396/452, 495, 505, 510, 449, 471, 480, 493
See application file for complete search history.

(56) References Cited

U.S. PATENT DOCUMENTS 5,589,906 A * 12/1996 Shimizu ..................... 396/505

FOREIGN PATENT DOCUMENTS

| JP | 7-92580 | 10/1995 |
| JP | 2003-195389 A1 | 7/2003 |
| JP | 2004-157269 A1 | 6/2004 |

OTHER PUBLICATIONS

Chinese Office Action dated Aug. 4, 2010 with its English translation.

* cited by examiner

*Primary Examiner*—Clayton E Laballe
*Assistant Examiner*—Minh Q Phan
(74) *Attorney, Agent, or Firm*—Kratz, Quintos & Hanson, LLP

(57) ABSTRACT

A blade drive device includes: a board having an opening; a blade for adjusting an amount of the opening; and first and second drive rings having a support structure for commonly supporting the blade for swinging, rotating in an identical direction with a given speed difference, and being arranged in a same plane.

10 Claims, 3 Drawing Sheets

BLADE DRIVE DEVICE AND OPTICAL DEVICE

CROSS-REFERENCE TO RELATED APPLICATION

This application is a continuation of and claims priority to International Patent Application No. PCT/JP2009/052574 filed on Feb. 16, 2009, which claims priority to Japanese Patent Application No. 2008-061794 filed on Mar. 11, 2008, subject matter of these patent documents is incorporated by reference herein in its entirety.

BACKGROUND OF THE INVENTION

1. Field of the Invention

The present invention relates to blade drive devices and optical devices.

2. Description of the Related Art

Conventionally, there has been known a blade drive device having a drive ring for applying a drive force to a blade, which adjusts an opening amount of an opening formed on a board (see Japanese Examined Patent Application Publication No. 07-92580).

In such a blade drive device, it is preferable to reduce and transmit the drive force from a drive source to the blade, in order to improve the positional accuracy of the blade. However, in order to reduce a speed of the drive force from the drive source, it is necessary to transmit the drive force to the drive ring via plural gears. There is a problem in which the blade drive device is increased in size due to the presence of such gear for reducing the speed.

SUMMARY OF THE INVENTION

It is therefore an object of the present invention to provide a blade drive device in which the positional accuracy of a blade is improved and an increase in its size is suppressed.

According to an aspect of the present invention, there is provided a blade drive device including: a board having an opening; a blade for adjusting an amount of the opening; and first and second drive rings having a support structure for commonly supporting the blade for swinging, rotating in an identical direction with a given speed difference, and being arranged in a same plane.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
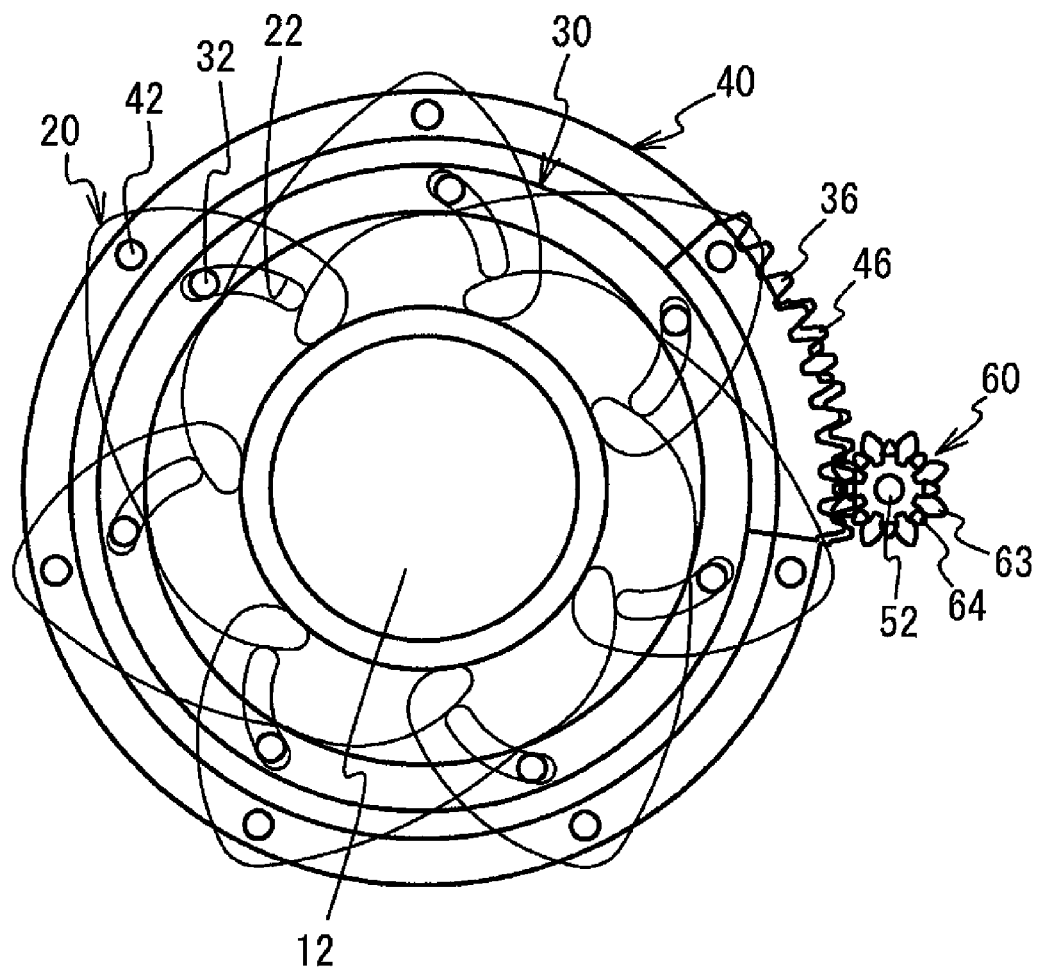
FIG. 1 is a perspective view of a blade drive device in a fully opened state.

A description will now be given, with reference to the accompanying drawings, an embodiment of the present invention. FIG. 1 is a perspective view of a blade drive device in a fully opened state, FIG. 2 is a perspective view of the blade drive device in a small aperture state, and FIG. 3 is a partially cross-sectional view of the blade drive device.

Figure 2:
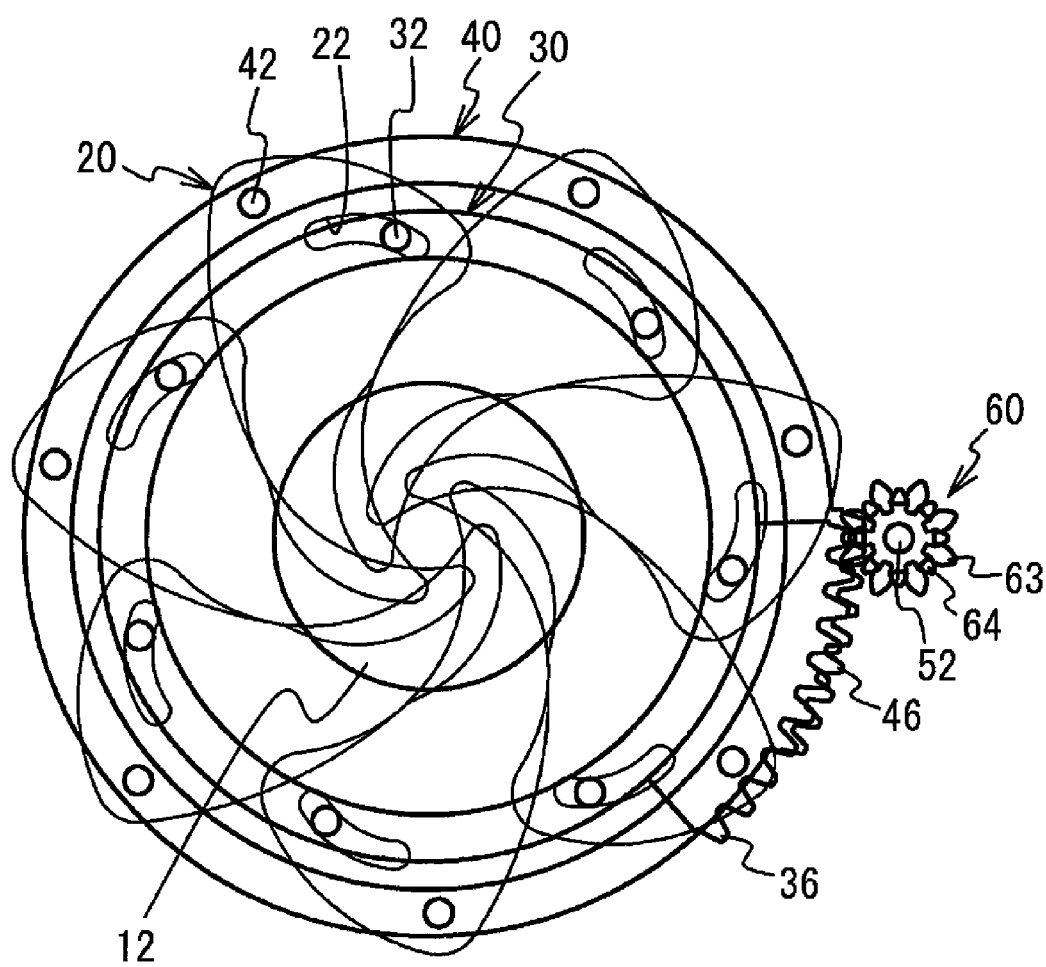
FIG. 2 is a perspective view of the blade drive device in a small aperture state.
Figure 3:
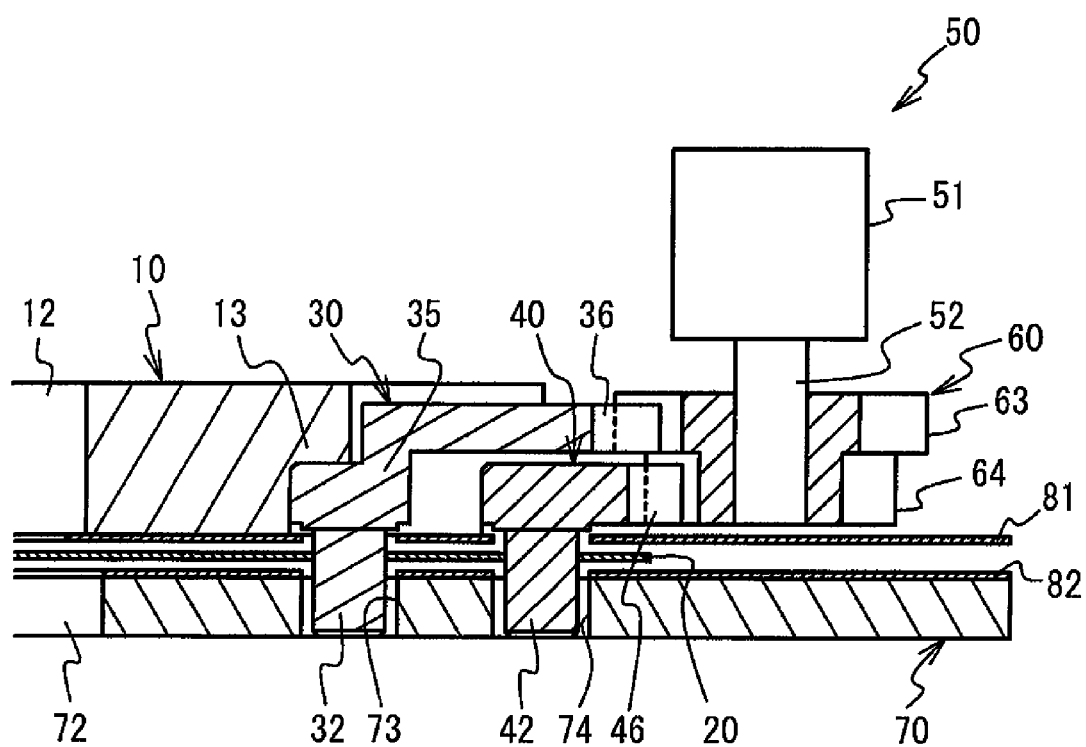
FIG. 3 is a partially cross-sectional view of the blade drive device.

Referring to FIGS. 1 to 3, the blade drive device according to the present embodiment includes: a board 10 having an opening 12 at its center portion; plural blades 20 adjusting the opening amount of the opening 12; drive rings 30 and 40 rotatably supported on the board 10 and transmitting a drive force to the plural blades 20; an electromagnetic actuator 50 serving as a drive source; a pinion gear 60; and a blade retaining board 70 having an opening 72. The drive rings 30 and 40 respectively serve as first and second drive rings.

The board 10, the blades 20, the drive rings 30 and 40, the pinion gear 60, and the blade retaining board 70 are made of synthetic resins. The drive rings 30 and 40 are arranged concentrically with the opening 12. Further, plural drive pins 32 are arranged at even intervals on the drive ring 30. Plural spindle portions 42 are arranged at even intervals on the drive ring 40. The drive pins 32 and the spindle portions 42 serve as a support structure for commonly supporting the blades 20 for swinging. The number of the drive pins 32 is identical to that of the blades 20. The number of the spindle portion 42 is identical to that of the blades 20. The drive pins 32 are arranged closer to the opening 12 than the spindle portions 42. The spindle portion 42 is engaged with a hole formed on the blade 20, so that the blade 20 is swingably supported. Further, the drive pin 32 is engaged with a cam hole 22 having a circular shape. Furthermore, FIGS. 1 and 2 are views of the blade drive device when viewed from the blade retaining board 70 side. The blade retaining board 70 is omitted in FIGS. 1 and 2. Moreover, the electromagnetic actuator 50 is partially omitted in FIG. 3.

Additionally, the drive rings 30 and 40 are provided with teeth portions 36 and 46 at their peripheral portions in the given ranges, respectively. The teeth portions 36 and 46 respectively correspond to first and second teeth portions. The range where the teeth portion 36 is arranged is larger than the range where the teeth portion 46 is arranged. As illustrated in FIG. 3, the teeth portion 36 is located at a radially outward position with respect to a step portion 35. The teeth portions 36 and 46 are arranged in line in the optical axis direction. Further, the pinion gear 60, which transmits the drive force to the drive rings 30 and 40, has gears 63 and 64 directly meshing with the teeth portions 36 and 46, respectively. The teeth portion 36 and the gear 63 meshing with the teeth portion 36 serve as a first engagement portion, whereas the teeth portion 46 and the gear 64 meshing with the teeth portion 46 serve as a second engagement portion. Further, the pinion gear 60 is made of a resin and press fitted onto a rotary shaft 52 of a rotor 51 included in the electromagnetic actuator 50. This allows the gears 63 and 64 and the rotor 51 to integrally rotate. As illustrated in FIG. 3, the gears 63 and 64 are arranged in line in the optical axis direction, that is, in the axial direction of the rotary shaft 52. The gears 63 and 64 are integrally formed. The pitch circle radius of the gear 63 is larger than that of the gear 64. The gears 63 and 64 are identical to each other in the number of teeth.

The drive ring 30 is housed within a space defined between the board 10 and the blade retaining board 70. Further, a blade support board 81 is attached to the board 10 on its surface opposite the blade retaining board 70, and a blade support board 82 is attached to the blade retaining board 70 on its surface opposite the board 10. The blade support board 81 has an opening smaller than the opening 12 in diameter, although the opening does not have its reference number. This opening defines the maximum amount of the opening in the fully opened state. The blade support board 82 functions to prevent an operational failure of the blades 20 due to static electricity within the space defined between the board 10 and the blade retaining board 70. Further, the diameter of the opening 72 is substantially identical to or slightly larger than that of the opening 12. Furthermore, the blade retaining board 70 has receiving holes 73 and 74 which respectively permit the movements of the drive pins 32 and the spindle portions 42, as illustrated in FIG. 3. Moreover, the board 10 is formed with a sliding portion 13 which slidably contacts the drive ring 30 to restrict the play thereof in the optical axis direction and the radial direction. Also, the board 10 is formed with a slidable portion, not illustrated, which contacts the drive ring 40 to restrict a play of thereof in the optical axis direction and the radial direction.

Herein, a description will be given of an operation of the blades 20. The rotary shaft 52 rotates from the fully opened state illustrated in FIG. 1 to mesh the gear 63 with the teeth portion 36 and to mesh the gear 64 with the teeth portion 46, thereby transmitting the drive force from the electromagnetic actuator 50 to the drive rings 30 and 40. Herein, a speed reduction ratio of the gear 63 to the teeth portion 36 is different from that of the gear 64 to the teeth portion 46. More specifically, the speed reduction ratio of the gear 64 and the teeth portion 46 is larger than that of the gear 63 and the teeth portion 36. That is, a rotational angle of the drive ring 30 is larger than that of the drive ring 40, under the condition that the rotor 51 rotates the same number of times. Therefore, the drive rings 30 and 40 rotate with a given speed difference.

When the drive rings 30 and 40 rotate clockwise from the fully opened state illustrated in FIG. 1, the blade 20 swings to reach the opening 12 from a position where the blade 20 recedes from the opening 12, due to a change of the positional relationship between the drive pin 32 and the spindle portion 42 which supports the blade 20 to swing. Moreover, the drive pin 32 and the spindle portion 42, which support the blade 20 move away from each other. Thus, the drive pin 32 moves within the cam hole 22, so that the blade 20 swings to reach the opening 12, thereby shifting to the small aperture state illustrated in FIG. 2.

In this way, the drive rings 30 and 40 rotate in the same direction with a given speed difference. In this manner of rotation, the relative speed between the drive rings 30 and 40 is reduced, as compared with a case where any one of the drive rings 30 and 40 is fixed. Therefore, unlike a conventional blade drive device, the drive force from the electromagnetic actuator 50 can be decelerated and transmitted to the blades 20 without the provision of plural gears for speed reduction. The blades 20 are decelerated, thereby improving their positional accuracies. Specifically, in the blade drive device in which the blades 20 are stopped at given positions to adjust an aperture amount of the opening 12, the control accuracy of the aperture amount is improved. Additionally, it is unnecessary to provide plural gears for speed reduction, thereby suppressing an increase in the number of the parts and an increase in the size of the blade drive device.

Also, since the gears 63 and 64 are arranged in line in the axial direction of the rotary shaft 52 so as to rotate in conjunction with the rotor 51, the space can be effectively used and the aperture amount of the opening 12 can be controlled with the single electromagnetic actuator 50. Furthermore, since the gears 63 and 64 are integrally formed, the number of the parts can be reduced, and the increasing of the size and the cost of the blade drive device can be suppressed.

Further, the drive rings 30 and 40 are arranged in the same plane, and the teeth portions 36 and 46 are arranged in different planes. That is, the teeth portions 36 and 46 are arranged in line in the optical axis direction. Therefore, the interference of the teeth portions 36 and 46 are prevented. Further, the teeth portion 36 faces a surface, of the drive ring 40, opposite the surface where the spindle portions 42 are provided, thereby also preventing the interference of the drive ring 30 and the spindle portion 42. Such a configuration can provide the blade drive device in which its size is reduced without increasing the space in the optical axis direction.

While the exemplary embodiments of the present invention have been illustrated in detail, the present invention is not limited to the above-mentioned embodiments, and other embodiments, variations and modifications may be made without departing from the scope of the present invention.

Additionally, the support structure may includes: a spindle which is supporting the blade 20 and is provided in the drive ring 30; and a drive pin which engages with the cam hole 22 and is provided in the drive ring 40.

Moreover, the blade 20 may be provided with a spindles portion, and the drive ring 30 or 40 may be provided with a spindle hole engaged with the spindle portion. In addition, the blade 20 may be provided with a drive pin, and the drive ring 30 or 40 may be provided with a cam hole engaged with the drive pin. Also, the blade 20 may be provided with a spindle portion for supporting the blade 20, and the drive ring may be provided with a hole engaged with the spindle portion.

Further, the teeth portions 36 and 46 may be formed on the inner peripheral portions of the drive rings 30 and 40, respectively. Furthermore, the rotational angle of the drive ring 40 may be larger than that of the drive ring 30, under the condition that the rotor 51 rotates the same number of times.

Finally, several aspects of the present invention are summarized as follows.

According to an aspect of the present invention, there is provided a blade drive device including: a board having an opening; a blade for adjusting an amount of the opening; and first and second drive rings having a support structure for commonly supporting the blade for swinging, rotating in an identical direction with a given speed difference, and being arranged in a same plane.

The first and second drive rings rotate in the same direction with a given difference in speed. This reduces the relative speed of the first and second drive rings, as compared with a case where any one of the first and second drive rings is fixed. Therefore, the relative speed of the first and second drive rings can be reduced. Consequently, the blade speed can be reduced without the intervention of a gear for reducing speed, so the blade can be controlled with high accuracy. Additionally, since the first and second drive rings are arranged in the same plane, the blade drive device that has been reduced in size can be provided without increasing the space in the optical axis direction.

In the above configuration, the blade drive device may include a drive source for exerting a drive force to the first and second drive rings, first and second engagement portions may respectively engage the drive source with the first and second drive rings, and the first and second engagement portions may be arranged in different planes.

This provides the blade drive device that has been reduced in size, without increasing the space in the optical axis direction.

In the above configuration, the first and second drive rings may respectively have first and second teeth portions, the first and second teeth portions may respectively mesh with first and second gears integrally rotating, and a speed reduction ratio of the first teeth portion to the first gear may be different from a speed reduction ratio of the second teeth portion to the second gear.

With such a configuration, the first and second drive rings rotate in the same direction with a given difference in speed, thereby reducing the relative speed of the first and second drive rings. Therefore, the blade speed can be reduced and controlled with high accuracy without the intervention of gears for speed reduction.

In the above configuration, the blade drive device may include a drive source exerting a drive force to the first and second drive rings and including a rotor, and the first and second gears may integrally rotate with the rotor.

With such a configuration, since the first and second drive rings are rotated by a single drive source, the blade is controlled with high accuracy while the device's size or cost is reduced.

In the above configuration, the first and second gears may be arranged in line in an axial direction of the rotor.

With such a configuration, since the first and second drive rings are driven by the single drive source, the blade is controlled with high accuracy while the device's size or cost is reduced.

In the above configuration, the first and second teeth portions may be arranged in different planes. This can provide the blade drive device having been reduced in size without increasing the space in the optical axis direction.

In the above configuration, the first and second gears may be integrally formed. This can reduce the number of the parts, thereby providing the blade drive device at low cost.

In the above configuration, the support structure may include: a spindle provided in one of the blade and the first drive ring; and a hole provided in the other of the blade and the first drive ring, and engaging with the spindle.

In the above configuration, the support structure may include: a drive pin provided in one of the blade and the second drive ring; and a cam hole provided in the other of the blade and the second drive ring, and engaging with the drive pin.

Additionally, the above mentioned object is also achieved by an optical device having any one of the shutter drive devices as mentioned above.

What is claimed is:

1. A blade drive device, comprising:
   a board having an opening;
   a blade for adjusting an amount of the opening; and
   first and second drive rings having a support structure for commonly supporting the blade for swinging, rotating in an identical direction with a given speed difference, and having a substantially identical plane of rotation.

2. The blade drive device of claim 1, further comprising a drive source for exerting a drive force to the first and second drive rings,
   first and second engagement portions respectively engaging the drive source with the first and second drive rings, and the first and second engagement portions being arranged in different planes.

3. The blade drive device of claim 1, wherein:
   the first and second drive rings respectively have first and second teeth portions;
   the first and second teeth portions respectively mesh with first and second gears integrally rotating; and
   a speed reduction ratio of the first teeth portion to the first gear is different from a speed reduction ratio of the second teeth portion to the second gear.

4. The blade drive device of claim 3, further comprising a drive source exerting a drive force to the first and second drive rings and including a rotor,
   wherein the first and second gears integrally rotate with the rotor.

5. The blade drive device of claim 4, wherein the first and second gears are arranged in line in an axial direction of the rotor.

6. The blade drive device of claim 3, wherein the first and second teeth portions are arranged in different planes.

7. The blade drive device of claim 3, wherein the first and second gears are integrally formed.

8. The blade drive device of claim 1, wherein the support structure includes:
   a spindle provided in one of the blade and the first drive ring; and
   a hole provided in the other of the blade and the first drive ring, and engaging with the spindle.

9. The blade drive device of claim 1, wherein the support structure includes:
   a drive pin provided in one of the blade and the second drive ring; and
   a cam hole provided in the other of the blade and the second drive ring, and engaging with the drive pin.

10. An optical device having the blade drive device, comprising:
    a board having an opening;
    a blade for adjusting an amount of the opening; and
    first and second drive rings having a support structure for commonly supporting the blade for swinging, rotating in an identical direction with a given speed difference, and having a substantially identical plane of rotation.

* * * * *